US009076151B2

(12) United States Patent
Patton et al.

(10) Patent No.: US 9,076,151 B2
(45) Date of Patent: Jul. 7, 2015

(54) GRAPHICAL CERTIFICATIONS OF ONLINE ADVERTISEMENTS INTENDED TO IMPACT CLICK-THROUGH RATES

(75) Inventors: John D. Patton, Seattle, WA (US); Robert P. Lipschutz, Bainbridge Island, WA (US); John M. Clyman, IV, Seattle, WA (US)

(73) Assignee: The Rubicon Project, Inc., Playa Vista, CA (US)

( * ) Notice: Subject to any disclaimer, the term of this patent is extended or adjusted under 35 U.S.C. 154(b) by 618 days.

(21) Appl. No.: 12/370,343

(22) Filed: Feb. 12, 2009
(Under 37 CFR 1.47)

(65) Prior Publication Data
US 2009/0327084 A1 Dec. 31, 2009

Related U.S. Application Data

(60) Provisional application No. 61/028,842, filed on Feb. 14, 2008.

(51) Int. Cl.
*G06Q 30/00* (2012.01)
*G06Q 30/02* (2012.01)

(52) U.S. Cl.
CPC ............ *G06Q 30/02* (2013.01); *G06Q 30/0263* (2013.01); *G06Q 30/0242* (2013.01); *G06Q 30/0241* (2013.01); *G06Q 30/0248* (2013.01);
(Continued)

(58) Field of Classification Search
CPC .......... G06Q 30/0241; G06Q 30/0242; G06Q 30/0248; G06Q 30/0254; G06Q 30/0263; G06Q 30/0271; G06Q 30/0277

USPC ................ 705/14.73, 76, 14.4, 14.41, 14.47, 705/14.52, 14.6
See application file for complete search history.

(56) References Cited

U.S. PATENT DOCUMENTS

| | | | |
|---|---|---|---|
| 6,393,420 B1 * | 5/2002 | Peters | .................................... 1/1 |
| 7,107,618 B1 * | 9/2006 | Gordon et al. | .................. 726/24 |
| 7,203,753 B2 * | 4/2007 | Yeager et al. | ................. 709/225 |

(Continued)

OTHER PUBLICATIONS

Press Release by TRUSTe published Sep. 20, 2007 on TRUSTe's web site at http://www.truste.org/about/press_release/09_20_07.php and currently available via the Internet Archive Wayback Machine at http://replay.web.archive.org/20071022041039/http://www.truste.org/about/press_release/09_20_07.php.*

*Primary Examiner* — Bennett Sigmond
(74) *Attorney, Agent, or Firm* — Knobbe, Martens, Olson & Bear LLP (57) ABSTRACT

Embodiments are directed towards improving a user's experience and confidence in advertisements shown within web pages or other online media, in part, by providing additional information for a given advertisement to be displayed along with the given advertisement to encourage, or discourage, a user to click on or interact with the advertisement. Such information to be displayed about a given advertisement may include, without limitation, information about the advertisement, such as its security status (e.g. it has been found to be free from malware), information about the advertiser, including if the advertiser is determined to be trusted based on some criteria, customer satisfaction information, information about the goods and/or services being advertised, including, for example, if how they compare to a competitor, and information about the destination Web page or Web site that the advertisement leads to when a user clicks it.

24 Claims, 6 Drawing Sheets

(52) U.S. Cl.
CPC ........ *G06Q 30/0254* (2013.01); *G06Q 30/0277* (2013.01)

(56) References Cited

U.S. PATENT DOCUMENTS

| | | | | |
|---|---|---|---|---|
| 7,424,457 | B2 * | 9/2008 | Khaishgi et al. | 705/50 |
| 7,433,832 | B1 * | 10/2008 | Bezos et al. | 705/26.8 |
| 7,814,029 | B1 * | 10/2010 | Siegel | 705/347 |
| 7,991,732 | B2 * | 8/2011 | Error | 707/603 |
| 8,438,499 | B2 * | 5/2013 | Dixon et al. | 715/809 |
| 2002/0147659 | A1 * | 10/2002 | Hong et al. | 705/26 |
| 2004/0243802 | A1 * | 12/2004 | Jorba | 713/168 |
| 2004/0261039 | A1 * | 12/2004 | Pagan | 715/797 |
| 2006/0015722 | A1 * | 1/2006 | Rowan et al. | 713/166 |
| 2006/0212931 | A1 * | 9/2006 | Shull et al. | 726/10 |
| 2006/0253578 | A1 * | 11/2006 | Dixon et al. | 709/225 |
| 2006/0282276 | A1 * | 12/2006 | Venzon et al. | 705/1 |
| 2007/0226053 | A1 * | 9/2007 | Carl et al. | 705/14 |
| 2007/0260520 | A1 * | 11/2007 | Jha et al. | 705/14 |
| 2008/0244639 | A1 * | 10/2008 | Kaaz | 725/34 |
| 2008/0275980 | A1 * | 11/2008 | Hansen | 709/224 |

\* cited by examiner

GRAPHICAL CERTIFICATIONS OF ONLINE ADVERTISEMENTS INTENDED TO IMPACT CLICK-THROUGH RATES

CROSS-REFERENCE TO RELATED APPLICATIONS

This application claims the benefit of U.S. Provisional Application Ser. No. 61/028,842 entitled "Graphical Certifications Of Online Advertisements Intended To Impact Click-Through Rates," filed on Feb. 14, 2008, the benefit of the earlier filing date of which is hereby claimed under 35 U.S.C. §119 (e) and which is further incorporated herein by reference.

TECHNICAL FIELD

The present invention relates generally to computing security and to a user's online advertisement experience, and more particularly, but not exclusively, to providing certificates for display with online advertisements, where in at least one embodiment the certified advertisement is directed to impact click-through rates.

BACKGROUND

The field of online advertising is both well-known and well-studied. In general, there are three primary types of online advertisements: banner advertisements, search result advertisements, and contextual advertisements, all of which appear on various web pages and other online locations on the Internet. Advertisements play a major economic role on the Web, and advertisers may pay for advertisements based on measures such as number of views or "impressions," numbers of click-throughs received, or numbers of products sold or customers contacted as a result of ads. Advertisers thus often have an economic incentive to increase the interest in their ads, the number of click-throughs that their ads receive, and the ultimate conversion of these click-throughs into some kind of event or transaction valuable to advertisers.

Today, Internet advertisements are displayed in a web page or other online locations with little or no additional information about the advertiser, advertisement, or good or service that is being advertised. This can leave the viewer of the advertisement with limited information and a number of questions about the advertisement or good or service that is being advertised.

For example, viewers of online advertisements do not know if an advertisement or the destination Web page or Web site that it leads to are trustworthy. For example, the ad itself or the destination landing page or site may contain dangerous software such as malware, which may perform undesired and/or unauthorized acts; it may have been hacked, or deliver unwanted "drive-by" exploits; it may contain misleading or fraudulent information or may take steps to compromise a user's privacy, and so on. As another example, the viewer has no indication of how useful other viewers found the advertisement. The viewers also may not know a reputation and historical performance of a specific advertiser or company, or how advertised products or services compare to those of the competition. The viewer may further not be aware of a size, location, age, maturity, etc. of the business that is advertising a good or service.

In the particular case of malware, online advertisements, as well as the destination websites that these advertisements direct viewers to, can be infected with software that performs malicious and/or other undesired acts without the knowledge or permission of the viewer. As the public becomes more and more aware of this danger, the need for additional information about an advertisement, the advertiser or the good and/or service that is being advertised grows. There appears therefore to be currently no convenient mechanism that provides additional information from a third party about online advertisements and/or destination websites.

Furthermore, current viewers of online advertisements appear to have no means of gaining additional information about a particular advertisement, the advertiser, and/or the good and/or service being advertised. The viewer typically must rely on the advertisement alone when making a decision as to whether to click on the advertisement or not. This can have negative effects on the effectiveness of the advertisements, in particular in the click-through rates of those advertisements. By comparison, a user who can verify that an advertisement, an advertiser, a good or service, or a destination Web page or Web site are in fact trustworthy or more positive due to some other characteristic may be more likely to click on that ad, an action to the benefit of the advertiser. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly, the present invention is directed towards enabling advertisers, publishers and other stakeholders to impact the click-through rate associated with a particular advertisement by including additional information such as a certificate and/or graphics within, next to, partially on, or over these advertisements, or otherwise accessible to an interested viewer (for example by hovering or clicking a mouse), to indicate a level of trust, and/or other information useable to increase a user's confidence towards clicking on the advertisement.

As used herein the term "certificate," refers to any document or file used to affirm some fact. A certificate as used herein is independent of a form or format in which the affirmation of the fact is made accessible. Thus, for example, a certificate may be made accessible as a graphic image, a text file, an audio clip, a video clip, and/or any combination of these forms or formats. While, in computing technologies, a certificate sometimes refers to a digital identity file, the term as used herein does not preclude such form or format in which the fact being affirmed may be embodied. It may be recognized, however, that a digital certificate, such as may be employed with digital signatures, may be employed to detect whether the contents of the certificate used to affirm the fact have been modified. Moreover, a certificate may affirm virtually any fact, including, without limit, an event, a satisfaction of a test, an audit, a review, an opinion, or the like. Thus, the additional information about online advertisements can provide a viewer with a variety of different information types including but not limited to richer information about the advertiser and/or the advertisers' goods and/or services to help the user make a more informed opinion about whether or not to click the advertisement. For example, in one embodiment, the additional information may provide a reason why the advertiser should be trusted, or should not be trusted. Such additional information may be intended to encourage viewers to click on the advertisement.

The additional information about online advertisements can be provided from an advertiser's or advertiser networks' servers and/or delivery network, from publishers' servers and/or delivery network, or from third party servers and/or delivery network.

The additional information about online advertisements can also be provided within, next to, partially on, or over, the online advertisements. The information may appear constantly; may appear for a limited period of time; may appear in response to user actions such as hovering a mouse over the ad, right-clicking the ad, or selecting a setting in a Web browser; or any combination of the preceding. Moreover, the additional information about online advertisements may be unique for a given advertisement or may cover a set of advertisements.

Where the additional information comes from an advertiser's or advertisers network's servers, one embodiment is that the advertiser or advertiser's network simply provides advertisements to the publisher that include an additional certificate that provide additional information about the core advertisement. This information may be embedded in the graphical ad image itself, in a third-party player technology such as a Macromedia Flash file, or in the HTML, program code, script, or other markup language that causes the browser to display the ad. In one embodiment, this additional information may be crafted to communicate or suggest that the additional information within the additional subsection is from a party independent of the advertiser. In the case of the additional information being delivered by an advertisers' delivery mechanism, an advertiser might elect to have its advertisement and/or web pages and/or goods and/or services reviewed by a reviewing party. The reviewing process might, in one embodiment, include tests including but not limited to tests to make sure the advertisement itself and/or web pages it links to are free of malware or malicious or deceptive content, as well as complies with various performance and/or user tests for the advertised goods or services and/or user reviews. Tests could be performed one time or multiple times, and in the case of multiple times they could be scheduled, unscheduled, or a mix of scheduled and unscheduled. In one embodiment, the tests and/or other audit activities may be based on a standard, a contractual policy, rule, or the like. For example, the reviewer might establish a set of criteria upon which the advertisement, web pages, goods, services, or the like, is expected to comply. In one non-limiting example, the criteria might require that the advertiser be have a particular ranking by the Better Business Bureau or other agency. In another non-limiting example, the audit might include performing consumer surveys, where the advertiser is expected to obtain a rating by the consumers above a particular threshold. The invention, however, is not limited to these examples, and any of a variety of other audit and/or test criteria may also be used.

Where a result of the review is determined to be unsatisfactory, the reviewer might provide a set of actions, and/or other criteria to be taken or otherwise satisfied in order to obtain a certificate from the reviewer.

Once provided with a satisfactory review and/or certificate as a result of the review process, as well as a contract that allows the advertiser to use information from the review and/or the certificate from the review, the advertiser could then appropriately modify their advertisement to display this review and/or review summary and/or certificate and then simply distribute this updated advertisement via their normal advertising channels. This modification of their advertisement could take the form of a visible graphical or text modification (e.g. a visible rating number or certificate "stamp") or a semi-visible modification (such as a watermark) or an invisible technical modification (e.g. a script) or a combination of these or more methods.

Various approaches could be used to combat fraud, such as, for example, a specific digital signature could be placed on an advertisement to be matched with a specific script to be run on a visible modification of the advertisement (e.g. a certificate stamp or icon) so that the visible modification of the advertisement would clearly illustrate if it were properly matched with the correct advertisement (e.g. the certificate stamp or icon would only show properly if it were properly matched with a specific advertisement). Moreover, in one embodiment, the certificate stamp, icon, or other information may be bound to the advertisement using virtually any mechanism that is configured and arranged to detect a change in the information and/or the advertisement. For example, in one embodiment, a digital signature may be employed. In one embodiment a mechanism might be implemented such as, but not limited to a code monitor, script, applet, or the like, that monitors changes to the digitally signed content, such that if a change is detected, a notification may be automatically sent. For example, in one embodiment, an initial hash obtained from the digital signature when the advertisement (and/or additional information) is first signed might be compared to hashes obtained at various times. Differences in the hashes would indicate that the advertisement (and/or additional information) has been changed. In one embodiment, a notification of the change may be made available to a viewer of the advertisement and/or additional information. In another embodiment, information about the detected change might be provided to a reviewer, the advertiser, or the like.

In one embodiment, where the advertisement is configured as a rotating banner advertisement, or employs a similar technique using dynamic content, a digital signature might be applied to a script, application, or other source of the dynamic content. For example, in one embodiment, if the dynamic content is provided through an animated gif or other similar mechanism, then the animated gif might be digitally signed. Similarly, if the dynamic content is provided through a self-contained applet, script, or the like, digitally signing the self-contained entity may be useable to identify unauthorized changes to the content. Where the dynamic content is accessed from a file, or the like, the script and the accessed file may be digitally signed (in one embodiment, separately) to monitor for unauthorized changes. Similarly, the information provided by a certificate or other mechanism and is associated with a graphic displayed with the advertisement may also be digitally signed.

In one embodiment, the reviewer might perform the binding. In another embodiment, the advertiser might digitally sign the advertisement and/or other information.

If the review and/or certificate information needed to updated or deleted, for example either as the result of an updated review or the result of a service contract term expiring, the reviewing party could simply notify the advertiser and contractually obligate them to update their advertisement. In one embodiment, reviews may be conducted automatically to determine if the additional information, advertisement, and/or other characteristics have changed such that the certificate information is determined not to be correct. For example, if an advertiser has indicated that they are a five star establishment, but, opinion polls, surveys, business reports, consumers, or the like, indicate that the advertise should no longer be rated as a five star establishment, then the reviewing party might notify the advertiser of a need to change the information displayed It is recognized that some Internet browser plug-in services exist that display additional information about hyperlinks on a webpage by placing icons next to a hyperlink or by creating a hover-over graphic. However, these browser plug-ins often may require a user to explicitly choose to download additional software to his or her computer to enable viewing the additional information. These plug-ins have significant disadvantages in that a publisher and advertiser have little or no control over whether or not a given user can see this additional information or is even using the plug-in, and, in the case when a user is using one or more of these plug-ins, a publisher and advertiser can not control the content of the additional information provided. A further disadvantage of these services is that they may not serve information about rotating banner advertisements. These services also do not offer the an advertiser an opportunity to ensure that his specific ads are annotated with additional information, thus differentiating his ads from competitors without the annotations and, the advertiser hopes, increasing click-through rates.

However, the present invention provides numerous advantages over traditional approaches. By placing additional information about an advertisement next to the advertisement, such as a graphic that illustrates that the advertisement is free from malware, or a graphic that illustrates that the advertiser is trusted by a third party, users can be encouraged to click on these advertisements. The impact on click-through rates may be achieved by providing independent or apparently independent third-party additional information about a particular advertiser or advertised good or service. The additional information may further motivate specific behavior of the viewer, allowing the advertiser, publisher, or other stakeholder to affect click-through rates.

Figure 1:
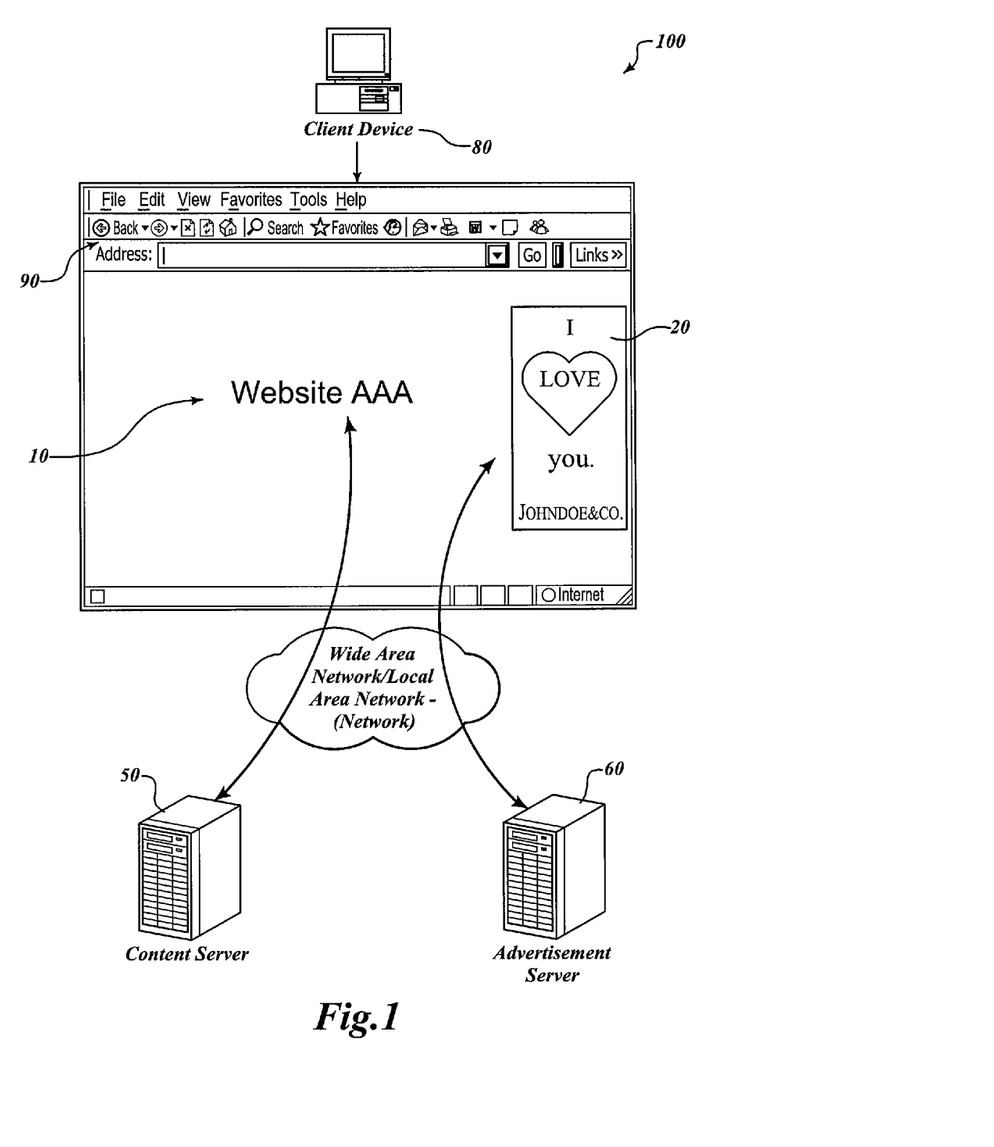
FIG. 1 illustrates one embodiment of a typical web page illustrated within a browser for a client device that includes an advertisement.

There are multiple types of information that can be useful to viewers when making a decision as to whether or not to click on an online advertisement. Information may include but is not limited to:

Technical safety of advertisement and destination page or site
Trustworthy nature of advertised company, good or service
Customer satisfaction rankings
Information about where advertising business is located, when it was established and other pertinent information about the business
Other certificates (e.g. Better Business Bureau)
Types of payment that are accepted
Competitive standing in marketplace
Preferred vendor status There are multiple graphical marks that may be used to convey specific information, rankings, or rating associated with a specific advertisement and/or company that are advertising a specific good or service. These marks may include but are not limited to:

Check mark
Stars
Text
"x" mark
Animated graphic
Thumbs-up/thumbs down graphic
Circles
Colored circles
Boxes
Colored boxes
Pop-up dialog boxes or menus that appear when moving a mouse near or over the advertisement
Audio, video, or other multimedia files Thus, embodiments of the present invention are directed to providing the viewer with more information to make well-informed decisions. Webpage owners and/or advertisers and/or publishers can use their ability to provide this information to encourage modification of viewer behavior and the associated click-through rates. Overall impacts to the businesses that purchase or display this additional information may include but are not limited to:

Increases in revenue associated with increased click-through rates
Enhanced trust and effectiveness of the advertising system
Enhanced viewer affinity
Increased recognition and accolade from industry
More efficient, safer means of delivering information Illustrative Environment FIG. 1 shows components of one embodiment of an environment in which the invention may be practiced. Not all the components may be required to practice the invention, and variations in the arrangement and type of the components may be made without departing from the spirit or scope of the invention. As shown in FIG. 1 is a typical web page 10 that is displaying an online banner advertisement 20 within a browser 90. A viewer employing client device 80 views the web page 10 within an Internet browser 90 and sees content provided via a website content server 50 as well as a display advertisement 20 displayed within the web page 10 that is provided via an advertisement server 60.

Generally, browser 90 may be hosted within any of a variety of client devices, such as client device 80, that may include virtually any mobile or non-mobile computing device capable of receiving and sending a message over a network, such as wireless network, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. The client device 80 may also include virtually any computing device that typically connects using a wired communications medium such as personal computers, multiprocessor systems, microprocessor-based or programmable consumer electronics, network PCs, or the like. In one embodiment, possible client devices may be configured to operate over a wired and/or a wireless network.

Moreover, the client device 80 typically ranges widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. One embodiment of a computing device that may be used as client device 80 is described in more detail below in conjunction with FIG. 5.

A web-enabled client device 80 may include a browser 90 that is configured to receive and to send web pages, web-based messages, or the like, such as is illustrated in FIG. 1. The browser 90 may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message.

A wireless network may be configured to couple at least one possible client device 80 to servers 50 and 60. The wireless network may include any of a variety of wireless sub-networks that may further overlay stand-alone ad-hoc networks, or the like, to provide an infrastructure-oriented connection for the client device. Such sub-networks may include mesh networks, Wireless LAN (WLAN) networks, cellular networks, or the like.

The wireless network may further include an autonomous system of terminals, gateways, routers, or the like connected by wireless radio links, or the like. These connectors may be configured to move freely and randomly and organize themselves arbitrarily, such that the topology of the wireless network may change rapidly.

The wireless network may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices with various degrees of mobility. For example, the wireless network may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, the wireless network may include virtually any wireless communication mechanism by which information may travel between client devices and another computing device, network, or the like.

In another embodiment, the available network that may be configured to enable servers 50 and 60 to communicate with the client devices and may employ any form of computer readable media for communicating information from one electronic device to another. Also, the network can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

Content server 50 may be virtually any network device configured and arranged to provide content to a client device, where the content includes virtually any information, in virtually any format that may be communicated over a network. For example, the information may include advertisements, such as advertisement 20 that may be displayed within a web page. In one embodiment, the advertisement may be provided by advertisement server 60 to content server 50 for inclusion into the web page 10. In another embodiment, the web page 10 may include a script, link, reference, or the like, to advertisement 20 that is hosted and accessible through advertisement server 60. Access to advertisement 20 for display at web page 10 is not limited to these approaches, and virtually any mechanism may be employed.

In any event, devices that may operate as servers 50 and/or 60 include personal computers, desktop computers, multiprocessor systems, microprocessor-based or programmable consumer electronics, network PCs, servers, or the like. One embodiment of a network device useable as servers 50 and/or 60 is described in more detail below in conjunction with FIG. 6.

Figure 2:
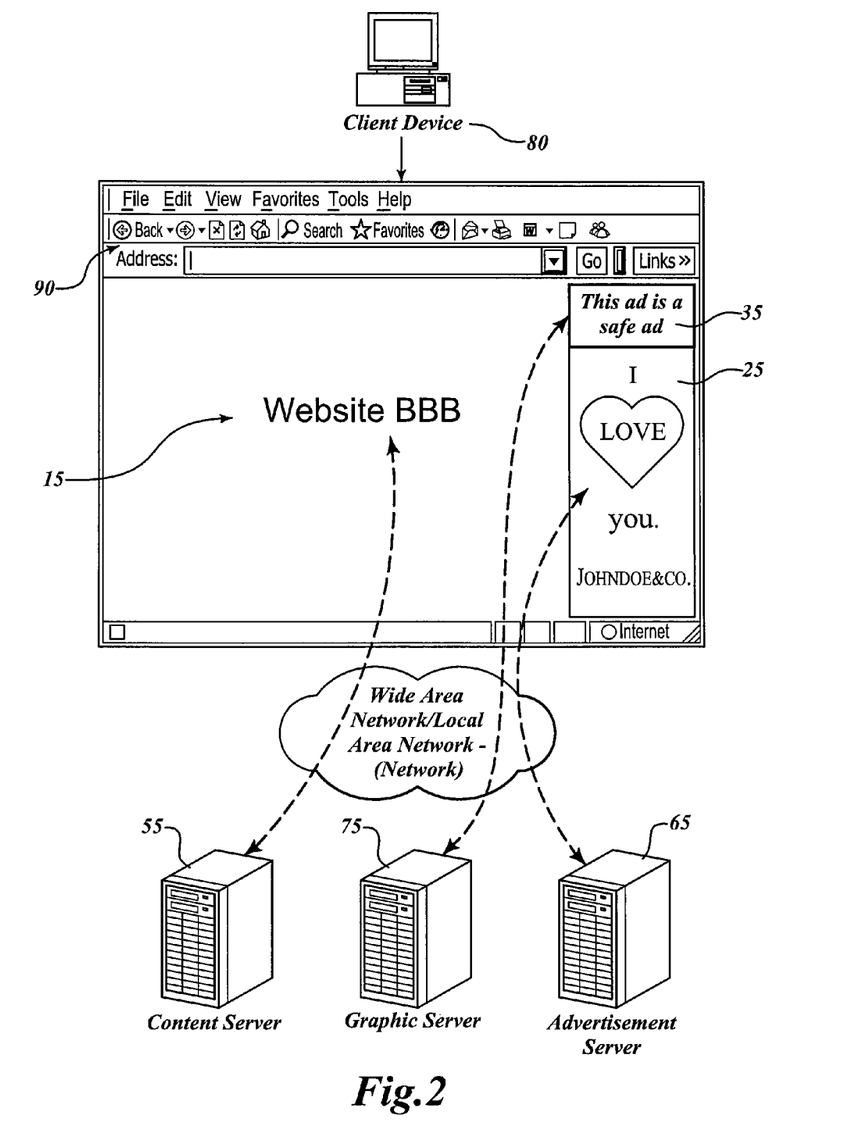
FIG. 2 illustrates one embodiment of an operating environment in which a web page that includes an advertisement and one possible embodiment of a graphic displayed within a browser of a client device (e.g., here the graphic illustrates that the advertisement is safe as having been checked for possible malware)

FIG. 2 illustrates one embodiment of an operating environment in which a web page that includes an advertisement and one possible embodiment of a graphic displayed within a browser of a client device (e.g., here the graphic illustrates that the advertisement is safe as having been checked for possible malware). Not all the components may be required to practice the invention, and variations in the arrangement and type of the components may be made without departing from the spirit or scope of the invention. However, as shown, FIG. 2 includes a web page 15 similar to that which was described in FIG. 1, with content served by a content server 55 and a display advertisement 25 served by an advertisement server 65.

However, also shown is one embodiment of an additional graphic 35 that is displayed next to the display advertisement 25 giving the viewer using client device 80, using the browser 90, additional information about the webpage advertisement 25. It should be noted that the information illustrated within graphic 35 may include other and/or different information that shown in FIG. 2. Thus, the invention is not limited by this example, and clearly, others forms, content, and even placement of graphic 35 are envisaged. Graphic 35 (and additional graphic 37 in FIG. 3) represent non-limiting, non-exhaustive embodiments of certificates.

However, in this particular non-exhaustive example, the additional information shown in the additional graphic 35 is about the advertisement 25 is directed towards indicating whether the advertisement is a safe advertisement (e.g. the advertisement has been checked for malware and found to be malware free, and/or other possible security concerns). In this example, the additional graphic 35 may be served by an additional graphic server 75. However, the invention is not so limited, and in another embodiment, the graphic 35 may be provided to server 55 and/or 65 from graphic server 75 for inclusion within web page 15.

Figure 3:
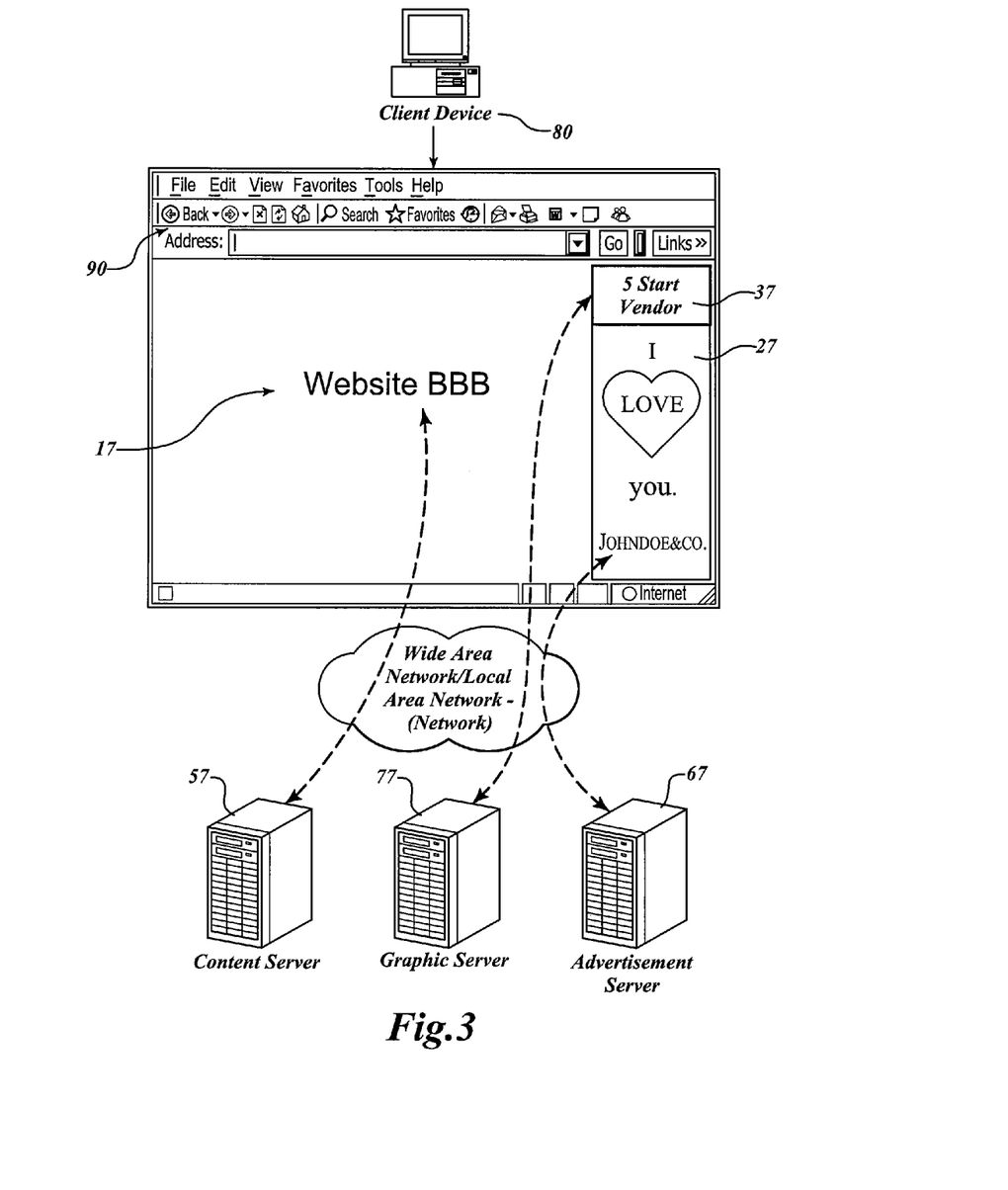
FIG. 3 illustrates one embodiment of an operating environment in which a web page that includes an advertisement and one possible embodiment of a graphic displayed within a browser of a client device (e.g., here the graphic illustrates that the advertiser associated with the advertisement has a star rating or 5 indicated as one embodiment for indicating the advertiser's trust as a vendor)

FIG. 3 illustrates one embodiment of an operating environment in which a web page that includes an advertisement and one possible embodiment of a graphic displayed within a browser of a client device (e.g., here the graphic illustrates that the advertiser associated with the advertisement has a star rating of 5 indicated as one embodiment for indicating the advertiser's trust as a vendor).

As further shown in FIG. 3 is a web page 17 similar to that which was described in FIG. 1, with content served by a content server 57 and a display advertisement 27 served by an advertisement server 67. An additional graphic 37 is displayed next to the display advertisement 27 giving the viewer using client device 80, using the browser 90, additional information about the webpage advertisement 27. In this particular example, the additional information in the additional graphic 37 is about the advertisement 27 being from a "5 star vendor." For example, the advertisement is from a recommended vendor. In this example, the additional graphic 37 is served by an additional graphic server 77. However, the invention is not so limited, and the additional graphic 37 may also be served by other servers, including, but not limited to content server 57, and/or advertisement server 67.

Moreover, as stated elsewhere, graphic 37 might remain hidden on the web page 17 until a user performs some action, including, but not limited to hovering a mouse over advertisement 27 for some defined time period, right-clicking on advertisement 27, or the like. In another embodiment, graphic 37 might appear constantly in association with advertisement 27.

In each of the non-exhaustive examples above, the additional information may be bound to the advertisement using any of a variety of mechanisms such that when a change is made to the additional information and/or the advertisement it may be readily detected. For example, the additional information and/or the advertisement may be individually and/or collectively digitally signed such that a modification to the information and/or advertisement might corrupt the digital signature. Other mechanisms may also be employed without narrowing the scope of the invention. In any event, the binding of the additional information and advertisement may enable modifications to be detected and to further notify a reviewer, an administrator, or the like. In one embodiment, a viewer of the additional information might be enabled to click on the additional information to confirm whether the advertisement is still valid, unmodified, or the like. Thus, additional information not necessarily shown within the graphic may be readily provided to the viewer, including whether the additional information and/or advertisement have been modified since it was last reviewed, and/or approved.

Illustrative Client Device

Figure 5:
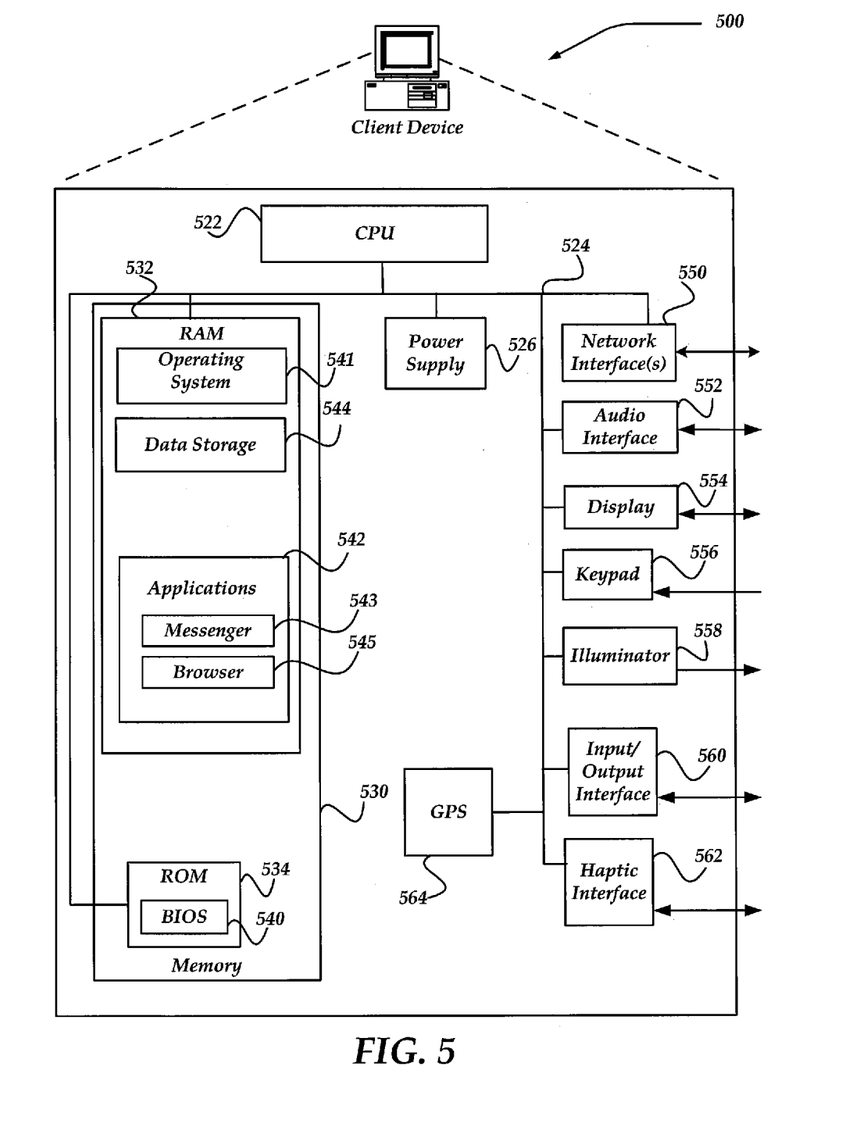
FIG. 5 shows one embodiment of a client device that may be included in a system implementing various embodiments.

FIG. 5 shows one embodiment of client device 500 that may be included in a system implementing the invention. Client device 500 may include many more or less components than those shown in FIG. 5. However, the components shown are sufficient to disclose an illustrative embodiment for practicing the present invention. Client device 500 may represent, for example, one embodiment of client device 80 of FIG. 1.

As shown in the figure, client device 500 includes a processing unit (CPU) 522 in communication with a mass memory 530 via a bus 524. Client device 500 also includes a power supply 526, one or more network interfaces 550, an audio interface 552, a display 554, a keypad 556, an illuminator 558, an input/output interface 560, a haptic interface 562, and an optional global positioning systems (GPS) receiver 564. Power supply 526 provides power to client device 500. A rechargeable or non-rechargeable battery may be used to provide power. The power may also be provided by an external power source, such as an AC adapter or a powered docking cradle that supplements and/or recharges a battery.

Client device 500 may optionally communicate with a base station (not shown), or directly with another computing device. Network interface 550 includes circuitry for coupling client device 500 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 550 is sometimes known as a transceiver, transceiving device, or network interface card (NIC).

Audio interface 552 is arranged to produce and receive audio signals such as the sound of a human voice. For example, audio interface 552 may be coupled to a speaker and microphone (not shown) to enable telecommunication with others and/or generate an audio acknowledgement for some action. Display 554 may be a liquid crystal display (LCD), gas plasma, light emitting diode (LED), or any other type of display used with a computing device. Display 554 may also include a touch sensitive screen arranged to receive input from an object such as a stylus or a digit from a human hand.

Keypad 556 may comprise any input device arranged to receive input from a user. For example, keypad 556 may include a push button numeric dial, or a keyboard. Keypad 556 may also include command buttons that are associated with selecting and sending images. Illuminator 558 may provide a status indication and/or provide light. Illuminator 558 may remain active for specific periods of time or in response to events. For example, when illuminator 558 is active, it may backlight the buttons on keypad 556 and stay on while the client device is powered. Also, illuminator 558 may backlight these buttons in various patterns when particular actions are performed, such as dialing another client device. Illuminator 558 may also cause light sources positioned within a transparent or translucent case of the client device to illuminate in response to actions.

Client device 500 also comprises input/output interface 560 for communicating with external devices, such as a headset, or other input or output devices not shown in FIG. 5. Input/output interface 560 can utilize one or more communication technologies, such as USB, infrared, Bluetooth™, or the like. Haptic interface 562 is arranged to provide tactile feedback to a user of the client device. For example, the haptic interface may be employed to vibrate client device 500 in a particular way when another user of a computing device is calling.

Optional GPS transceiver 564 can determine the physical coordinates of client device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS or the like, to further determine the physical location of client device 500 on the surface of the Earth. It is understood that under different conditions, GPS transceiver 564 can determine a physical location within millimeters for client device 500; and in other cases, the determined physical location may be less precise, such as within a meter or significantly greater distances. In one embodiment, however, client device 500 may through other components, provide other information that may be employed to determine a physical location of the device, including for example, a MAC address, IP address, or the like.

Mass memory 530 includes a RAM 532, a ROM 534, and other storage means. Mass memory 530 illustrates another example of computer readable storage media for storage of information such as computer readable instructions, data structures, program modules, or other data. Mass memory 530 stores a basic input/output system ("BIOS") 540 for controlling low-level operation of client device 500. The mass memory also stores an operating system 541 for controlling the operation of client device 500. It will be appreciated that this component may include a general purpose operating system such as a version of UNIX, or LINUX™, or a specialized client communication operating system such as, for example, Windows Mobile™, or the Symbian® operating system. The operating system may include, or interface with a Java virtual machine module that enables control of hardware components and/or operating system operations via Java application programs.

Memory 530 further includes one or more data storage 544, which can be utilized by client device 500 to store, among other things, applications 542 and/or other data. For example, data storage 544 may also be employed to store information that describes various capabilities of client device 500. The information may then be provided to another device based on any of a variety of events, including being sent as part of a header during a communication, sent upon request, or the like. Moreover, data storage 544 may also be employed to store information including address books, buddy lists, aliases, pictures, user profile information, or the like. At least a portion of the information may also be stored on a disk drive or other storage medium (not shown) within client device 500.

Applications 542 may include computer executable instructions which, when executed by client device 500, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 542 may include, for example, messenger 543, and browser 545.

Browser 545 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed.

Messenger 543 may be configured to initiate and manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 543 may be configured as an IM messaging application, such as AOL Instant Messenger, Yahoo! Messenger, .NET Messenger Server, ICQ, or the like. In another embodiment, messenger 543 may be a client application that is configured to integrate and employ a variety of messaging protocols. In one embodiment, messenger 543 may interact with browser 545 for managing messages.

Illustrative Network Device

Figure 6:
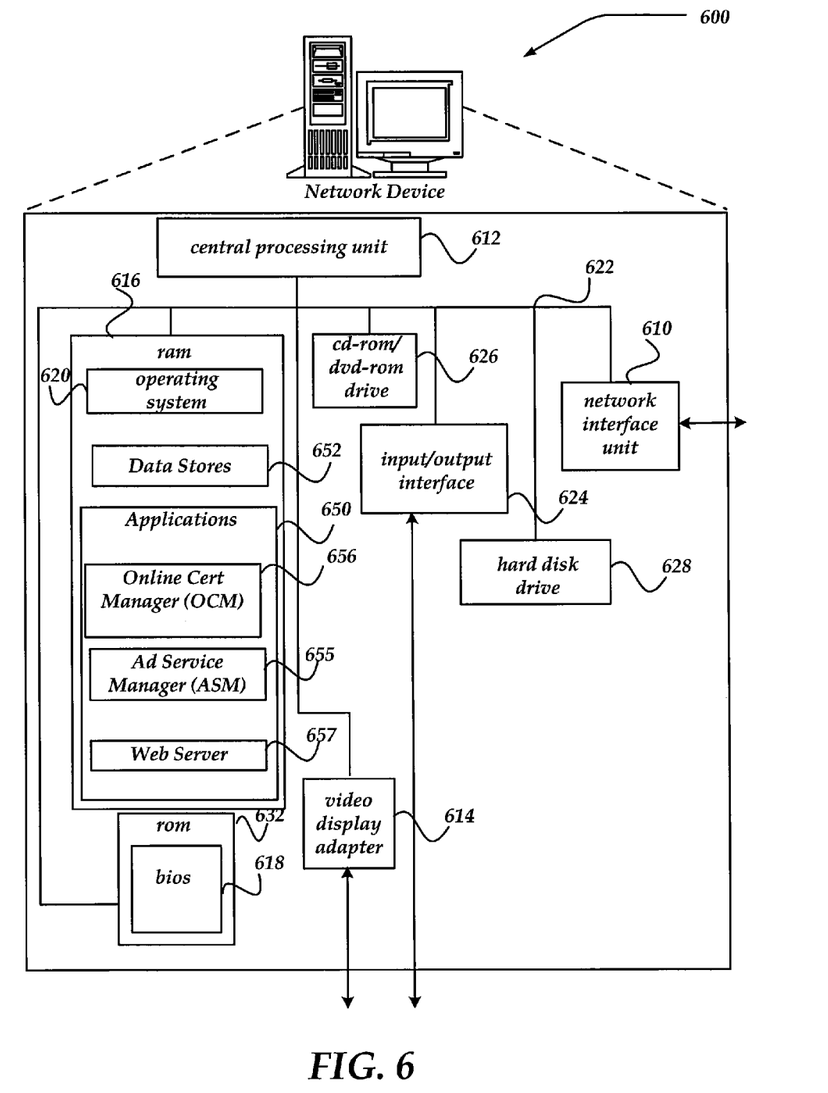
FIG. 6 shows one embodiment of a network device that may be included in a system implementing various embodiments.

FIG. 6 shows one embodiment of a network device 600, according to one embodiment of the invention. Network device 600 may include many more or less components than those shown. The components shown, however, are sufficient to disclose an illustrative embodiment for practicing the invention. Network device 600 may represent, for example, any one or more of content servers 50, 55, and 57; graphic servers 75 and 77; and/or advertisement servers 60, 65, and 67.

Network device 600 includes processing unit 612, video display adapter 614, and a mass memory, all in communication with each other via bus 622. The mass memory generally includes RAM 616, ROM 632, and one or more permanent mass storage devices, such as hard disk drive 628, tape drive, optical drive, and/or floppy disk drive. The mass memory stores operating system 620 for controlling the operation of network device 600. Any general-purpose operating system may be employed. Basic input/output system ("BIOS") 618 is also provided for controlling the low-level operation of network device 600. As illustrated in FIG. 6, network device 600 also can communicate with the Internet, or some other communications network, via network interface unit 610, which is constructed for use with various communication protocols including the TCP/IP protocol. Network interface unit 610 is sometimes known as a transceiver, transceiving device, or network interface card (NIC).

The mass memory as described above illustrates another type of computer-readable media, namely computer-readable storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

As shown, data stores 652 may include a database, text, spreadsheet, folder, file, or the like, that may be configured to maintain and certificates, graphics, graphical markings, templates, advertisements, web pages, or the like. In one embodiment, at least some of data store 652 might also be stored on another component of network device 600, including, but not limited to cd-rom/dvd-rom 626, hard disk drive 628, or the like.

The mass memory also stores program code and data. One or more applications 650 are loaded into mass memory and run on operating system 620. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Web server 657, advertisement service manager (ASM) 655, and Online Certificate Manager (OCM) 656 may also be included as application programs within applications 650. It should be noted, that while ASM 655 and OCM 656 are illustrated within a single network device, the invention is not so limited. Thus, in another embodiment, OCM 656 might be implemented within graphic servers 75 and 77 of FIGS. 2-3, respectively, while ASM 655 might be implemented within Advertisement servers 65 and 67 of FIGS. 2-3, respectively. However, as illustrated, ASM 655 and OCM 656 might be implemented in a single network device, such as Advertisement server 60 of FIG. 1.

Web server 657 represent any of a variety of services that are configured to provide content, including messages, over a network to another computing device. Thus, web server 657 includes for example, a web server, a File Transfer Protocol (FTP) server, a database server, a content server, or the like. Web server 657 may provide the content including messages over the network using any of a variety of formats, including, but not limited to WAP, HDML, WML, SMGL, HTML, XML, cHTML, xHTML, or the like. In one embodiment, web server 657 may be configured to enable a user to access and manage messages through messaging server 656.

ASM 655 is configured to manage creation, and/or providing of advertisements for display within a web page, such as are illustrated in FIGS. 1-3. ASM 655 may, in one embodiment, provide various tools to enable a creation and/or modification of one or more advertisements. However, in another embodiment, an advertisement might be provided through another network device and managed through ASM 655.

In one embodiment, ASM 655 might further provide an online store interface that may be accessible upon a user selection of an advertisement. For example, if a user clicks on an advertisement within a web page, the advertisement might redirect the user to one or more web pages that are associated with an advertiser. Thus, in one embodiment ASM 655 might provide the merchant's web pages, and/or other tools useable to manage a user's selection of an advertised product and/or service. In one embodiment, ASM 655 may store one or more web pages, advertisements, or the like, within data stores 652.

OCM 656 is configured to provide various certification functions, graphics, and/or other actions, usable to provide one or more graphics for display with an advertisement. For example, OCM 656 might be configured to provide graphics 35 and/or 37 for display within a web page.

In one embodiment, OCM 656 may further enable the provided graphic and/or advertisement to be digitally signed. OCM 656 may employ any of a variety of software useable to generate digital signatures. OCM 656 may further provide various monitoring mechanisms useable to monitor the provided graphic and/or advertisement for changes, malware, and/or other security concerns. In one embodiment, if an unauthorized modification is detected, OCM 656 may be configured to automatically send a message to a reviewer, advertiser, and/or other party indicating that an unauthorized modification has been detected.

In one embodiment, OCM 656 or ASM 655 may be configured to monitor click-through data for an advertisement. In this manner, statistical information may be obtained indicating whether the graphical certification information displayed with the advertisement might have impacted user actions. That is, by collecting click-through data associated with the advertisement, a determination may then be made as whether a change in click-through data is detected based on a presence of a certificate.

Reports may be provided to an advertiser that may include, but are not limited to trend data indicating when the graphical certification information displayed with an advertisement changed, and whether the change resulted in a statistically significant change in monitored click-through rates. It is noted that other monitoring may also be performed beyond merely click-through rates, including but not limited, for example, to purchases resulting from a click-through.

OCM 656 may also be configured to monitor for compliance by the advertiser with information that might be displayed within the additional graphic. In one embodiment, OCM 656 might automatically collect data from user surveys, user feedback, peer advertisers, or the like, to determine whether the information displayed is still correct. OCM 656 may use other mechanisms beyond these however, to make such determinations. In any event, if OCM 656 determines that the information displayed is no longer correct, and/or that a contract for displaying of such information has expired, OCM 656 might automatically contact the advertiser and indicate such non-compliance, contract expiration, or the like.

Generalized Operation

Figure 4:
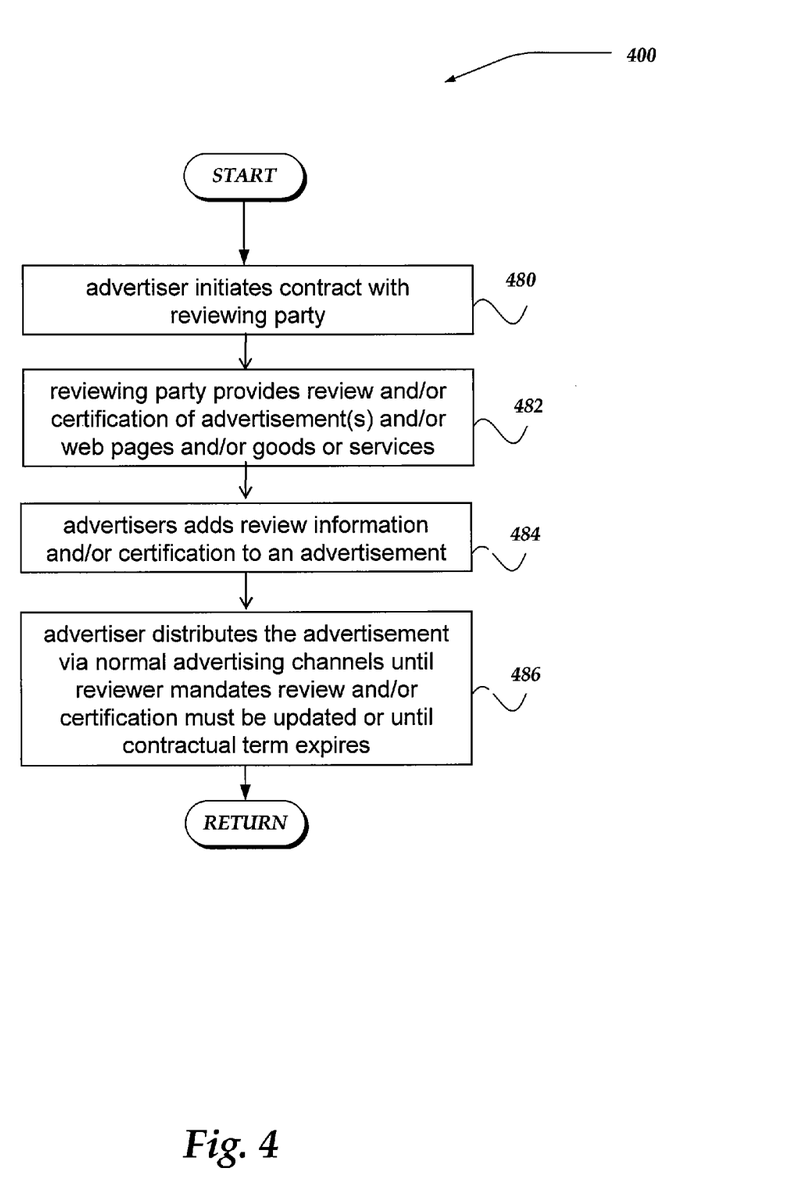
FIG. 4 illustrates one embodiment of a possible flow diagram useable for producing for display on web page an advertisement modified with a review and/or certificate.

The operation of certain aspects of the present invention will now be described with respect to FIG. 4. FIG. 4 illustrates one embodiment of a possible flow diagram useable for producing for display on web page an advertisement modified with a review and/or certificate. The process of FIG. 4 may be implemented within any of the graphic servers shown in FIGS. 2-3 (servers 75 and/or 77). However, the process may also be implemented across multiple distinct servers, without departing from the scope of the invention. For example, in another embodiment, process may also be implemented within an advertisement server such as illustrated in FIG. 1. In addition, portions of the process may be deployed independent of any server, or computing device per se.

In any event, as shown FIG. 4 depicts a process for process for a reviewer and advertiser to work together to produce an advertisement modified with a review and/or certificate graphic. Process 400 begins, after a start block, at block 480, where an advertiser initiates a contract with a reviewing party. Such actions may be performed using virtually any mechanisms for negotiating a contract, including online as well as offline.

Moving to block 482, the reviewing party provides a review and/or certificate of advertisement(s) and/or advertisers and/or web pages and/or goods or services. Such reviews may include, without limit, those discussed above.

In any event, if the reviewing party determines that the advertisement is permitted to display the additional information, the reviewing party provides the information/certificate to the advertiser.

Flowing next, in one embodiment, to block 484 the advertiser adds the review information and/or certificate to an advertisement. As noted above, in another embodiment, a website coordinator, or other party may be employed to add the additional information to the advertisement. Additionally, the advertisement and/or certificate may be digitally signed. In one embodiment, the reviewer may provide the digital signature. In another embodiment, the advertiser may digitally sign the advertisement and/or certificate.

The process then moves to block 486, where the advertiser distributes the advertisement via virtually any advertising channel until reviewer mandates review and/or certificate must be updated or until contractual term expires. For example, in one embodiment, a script, applet, or other mechanism might be used to monitor for changes in the certificate, other information, and advertisement. In one embodiment, changes might be detected by monitoring a hash obtained from the digital signature. If the hash is detected to have changed, a message might be sent to the reviewer and/or advertiser indicating that a change has been detected. The reviewer and/or advertiser may then conduct additional analysis to determine whether the change results in non-compliance of displayed information. If so, the certificate may be revoked, or corrections requested. Failure to make corrections to the displayed material might result in the reviewer revoking the certificate.

Moreover, in one embodiment, the reviewer might automatically conduct surveys, request user feedback, or the like, to obtain information about the displayed information. If the reviewer determines that the displayed information is no longer correct, the reviewer may request that it be corrected, revoke the certificate, and/or perform some other action. In any event, process 400 may then exit after 486.

It should be noted, however, that the invention is not constrained to communications as described above. Thus, in one embodiment, the reviewer may work with the advertiser. That is, in one embodiment, the advertiser may be the one that contracts with a reviewing party to review the advertisements, and the advertisements may then be modified with the additional descriptions/certificates, or the like and distributed via an advertiser's network and/or via any other mechanism, including through an end publisher.

However, in another embodiment, the reviewer may also interact with a publisher of the advertisement. Thus, in another embodiment, the publisher may contract with a reviewing party to review the advertisement and/or links that may show up on the publisher's site. The reviewer may then employ a system with a preemptively built database, or the like, of advertisements and/or links, as well as to be able to quickly check new advertisements and/or links that may show up on the publisher's site.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer-implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:
1. A network device, comprising:
a transceiver for sending and receiving information over a network; and
a processor that is configured to execute instructions that perform actions, including:
receiving a request for an audit associated with an advertisement containing a link to a destination web page that is part of a destination web site;
performing the audit to
determine a compliance to with at least one contractual criteria, standard, or rule;
determine whether any of the:
advertisement,
the destination web page, or
the destination web site
may result in malicious or undesired software being downloaded to a user computer;
based on a result of the audit, selectively performing a binding of a certificate to the advertisement, the binding being indicative that selection of the advertisement or downloading the destination web page or the destination web site will not result in malicious or undesired software being downloaded;
enabling the advertisement and the bound certificate to be displayed at a displayed web page, wherein the displayed web page includes the advertisement, the advertisement served by an advertisement server, content served by a content server, and the bound certificate, served by the network device, such that the certificate provides an indication that the advertisement, the destination web page, and the destination web site will not result in malicious or undesired software being downloaded;

if an unauthorized modification of the certificate or the advertisement is detected, sending an alert indicating that a modification is detected;

collecting statistical information, including click-through data associated with the advertisement, wherein the click-through data includes information indicative of interactions by user computers with the advertisement and the presence of the certificate indicating that the advertisement, the destination web page, and the destination web site will not result in malicious or undesired software being downloaded;

generating trend data using the collected statistical information, including the click-through data associated with the advertisement wherein the click-through data includes information indicative of interactions by user computers with the advertisement and the presence of the certificate indicating that the advertisement, the destination web page, and the destination web site will not result in malicious or undesired software being downloaded; and generating a trend data report using the trend data for transmission to a recipient.

2. The network device of claim 1, wherein detecting a modification further comprises digitally signing the certificate and the advertisement, and monitoring for a change based on the digital signature.

3. The network device of claim 1, wherein sending an alert further comprises sending an alert to a reviewer, wherein the reviewer determines whether the modification results in non-compliance to the at least one contractual criteria.

4. The network device of claim 1, wherein content within the certificate is provided by an advertiser.

5. A system that is operative to manage advertisements over a network, comprising:
   a first network device configured to perform actions, including:
      sending, for an advertiser, a request for an audit to be performed for a display of an online advertisement containing a link to a destination web page that is part of a destination web site;
      enabling a determination as to whether any of the:
         advertisement,
         the destination web page, or
         the destination web site
      may result in malicious or undesired software being downloaded to a user computer;
      based on determining that selection of the advertisement or downloading the destination web page or the destination web site will not result in malicious or undesired software being downloaded, receiving a certificate;
      providing the certificate and advertisement on a displayed web page, wherein the certificate provides an indication that the advertisement, the destination web page, and the destination web site will not result in malicious or undesired software being downloaded; and
      if an unauthorized modification to the certificate or the advertisement is detected, sending an alert indicating detection of the modification;
      collecting statistical information, including click-through data associated with the advertisement, wherein the click-through data includes information indicative of interactions by user computers with the advertisement and the presence of the certificate indicating that the advertisement, the destination web page, and the destination web site will not result in malicious or undesired software being downloaded;
      generating trend data using the collected statistical information, including the click-through data associated with the advertisement wherein the click-through data includes information indicative of interactions by user computers with the advertisement and the presence of the certificate indicating that the advertisement, the destination web page, and the destination web site will not result in malicious or undesired software being downloaded; and
      generating a trend data report using the trend data for transmission to a recipient.

6. The system of claim 5, wherein the certificate employs one or more graphical markings to convey at least a rating of the advertiser, wherein the one or more markings includes at least one of a check mark, a star, text, an animated graphic, a thumbs-up/down graphic, a pop-up dialog box, an audio clip, video clip, or a multimedia file.

7. The system of claim 5, wherein detecting a modification further comprises digitally signing the certificate or digitally signing the advertisement, and monitoring for a change based on at least one of the digital signatures.

8. The system of claim 5, wherein the certificate is hidden on the displayed web page until a user action is detected including at least one of hovering a mouse over the advertisement for a defined time period, or right-clicking the advertisement.

9. The system of claim 5, further comprising a second network device is configured to perform actions, comprising:
   monitoring for compliance to the at least one contractual criteria while the advertisement is made available for display on the displayed web page;
   and if a result of the monitoring indicates non-compliance, revoking the certificate.

10. A non-transitory computer-readable storage medium having computer-executable instructions, the computer-executable instructions when installed onto a computing device enable the computing device to perform actions, comprising:
   receiving a request for an audit associated with an advertisement containing a link to a destination web page that is part of a destination web site; performing the audit to determine whether any of the:
      advertisement,
      the destination web page, or
      the destination web site
   may result in malicious or undesired software being downloaded;
   based on a result of the audit, selectively performing a binding of a certificate to the advertisement, the binding being indicative that selection of the advertisement or downloading the destination web page, or the destination web site will not result in malicious or undesired software being downloaded;
   enabling the advertisement and the bound certificate to be displayed at a displayed web page, such that the certificate provides an indication that the advertisement, the destination web page, and the destination web site will not result in malicious or undesired software being downloaded;
   if an unauthorized modification of the certificate or the advertisement is detected, sending an alert indicating that a modification is detected;
   collecting statistical information, including click-through data associated with the advertisement, wherein the click-through data includes information indicative of interactions by user computers with the advertisement and the presence of the certificate indicating that the advertisement, the destination web page, and the destination web site will not result in malicious or undesired software being downloaded;

generating trend data using the collected statistical information, including the click-through data associated with the advertisement wherein the click-through data includes information indicative of interactions by user computers with the advertisement and the presence of the certificate indicating that the advertisement, the destination web page, and the destination web site will not result in malicious or undesired software being downloaded; and generating a trend data report using the trend data for transmission to a recipient.

11. The non-transitory computer-readable storage medium of claim 10, wherein the advertisement is configured with dynamic content.

12. The non-transitory computer-readable storage medium of claim 10, wherein the instructions enable the computing device to perform actions, further comprising: collecting click-through data associated with the advertisement to detect a change in click-through data based on a presence of the certificate.

13. The non-transitory computer-readable storage medium of claim 10, wherein detecting a modification further comprises digitally signing the certificate or digitally signing the advertisement, and monitoring for a change based on at least one of the digital signatures.

14. The non-transitory computer-readable storage medium of claim 10, wherein the certificate includes information about at least one of the advertisement, a security status for the advertisement, or a trust level for an advertiser of the advertisement.

15. The network device of claim 1, wherein the processor is further configured to execute instructions that perform actions, including:
    collecting statistics associated with users interacting with the advertisement;
    generating a report that shows the statistics so as to indicate when information of the certificate displayed with the advertisement changes; and
    presenting the report to an operator.

16. The network device of claim 1, wherein the processor is further configured to execute instructions that perform actions, including:
    determining that the information associated with the certificate is no longer correct; and
    automatically contacting an advertiser of the advertisement to notify the advertiser of a cause of a change in the information.

17. The network device of claim 16, wherein determining that the information associated with the certificate is no longer correct includes automatically determining whether the information associated with the certificate is no longer correct.

18. The network device of claim 16, wherein determining that the information associated with the certificate is no longer correct includes automatically determining whether a contract for displaying the information associated with the certificate has expired.

19. The network device of claim 1, wherein said processor is further configured to execute instructions that perform actions including:
    accessing additional information about the advertisement; and
    enabling the additional information about the advertisement to be displayed in association with the advertisement.

20. The network device of claim 19, wherein said processor is further configured to execute instructions that perform actions including:
    communicating a request to a remote computing system via a communications network;
    receiving the additional information; and
    enabling the additional information to be displayed with the advertisement for continuous, full-time display in association with the advertisement.

21. The network device according to claim 20, wherein said processor is further configured to execute instructions that perform actions including:
    enabling the additional information to be displayed in response to a user interaction.

22. The network device according to claim 20, wherein said processor, in enabling the additional information to be displayed with the advertisement, is further configured to execute instructions that perform actions including:
    visibly displaying the additional information.

23. The network device according to claim 1, wherein said processor is further configured to execute instructions that perform actions including:
    in furtherance of performing the audit, processing consumer reviews;
    in response to processing the consumer reviews, determining a rating based on the consumer reviews; and
    enabling the rating to be displayed in association with the advertisement.

24. The network device according to claim 23, wherein said processor is further configured to execute instructions that perform actions including:
    computing a rating based on the consumer reviews.

* * * * *

UNITED STATES PATENT AND TRADEMARK OFFICE
CERTIFICATE OF CORRECTION

| | | |
|---|---|---|
| PATENT NO. | : 9,076,151 B2 | Page 1 of 1 |
| APPLICATION NO. | : 12/370343 | |
| DATED | : July 7, 2015 | |
| INVENTOR(S) | : John D. Patton | |

It is certified that error appears in the above-identified patent and that said Letters Patent is hereby corrected as shown below:

Specification

In column 5 at line 56, Change "displayed" to --displayed.--.

In column 6 at line 35, Change "status" to --status.--.

In column 6 at line 53, Change "files" to --files.--.

In column 6 at line 67, Change "information" to --information.--.

In column 10 at line 19, Change "unmodified," to --un-modified,--.

Claims

In column 16 at line 43, In Claim 1, change "to" to --to:--.

In column 16 at line 44, In Claim 1, change "to with" to --with--.

In column 18 at line 30, In Claim 9, change "is configured" to --configured--.

Signed and Sealed this
Eighth Day of March, 2016

Michelle K. Lee
*Director of the United States Patent and Trademark Office*